United States Patent [19]

St-Amant et al.

[11] Patent Number: 5,536,278
[45] Date of Patent: Jul. 16, 1996

[54] PROCESS FOR ASSEMBLING LPB BATTERIES

[75] Inventors: Guy St-Amant, Trois-Riviéres West; Michel Duval, Montreal, both of Canada

[73] Assignee: Hydro-Quebec, Montreal, Canada

[21] Appl. No.: 216,423

[22] Filed: Mar. 23, 1994

[51] Int. Cl.$^6$ ................................................. H01M 10/04
[52] U.S. Cl. ...................... 29/623.3; 29/623.4; 429/188; 429/191; 429/192; 156/306.9; 156/309.9; 156/307.7
[58] Field of Search ...................... 429/188, 191, 429/192; 29/623.3, 623.4; 156/309.9, 306.6, 322

[56] References Cited

U.S. PATENT DOCUMENTS

| | | |
|---|---|---|
| 3,205,183 | 9/1965 | Vandenberg . |
| 4,173,506 | 11/1979 | Pletcher ................................... 156/309 |
| 4,303,748 | 12/1981 | Armand et al. . |
| 4,357,401 | 11/1982 | Andre et al. . |
| 4,502,903 | 3/1985 | Brueder ................................... 29/623.3 |
| 4,505,997 | 3/1985 | Armand et al. . |
| 4,578,326 | 3/1986 | Armand et al. . |
| 4,818,964 | 4/1989 | Wong . |
| 5,384,213 | 1/1995 | Olsen ................................... 429/191 |

FOREIGN PATENT DOCUMENTS

| | | |
|---|---|---|
| 1269702 | 5/1990 | Canada . |
| WO92/02966 | 2/1992 | WIPO . |

*Primary Examiner*—M. Nuzzolillo
*Attorney, Agent, or Firm*—Oblon, Spivak, McClelland, Maier & Neustadt

[57] ABSTRACT

Before laminating the electrolyte with the positive electrode, the electrolyte is heated at a temperature higher than its softening temperature or the melting temperature of its crystallites, and the heated electrolyte is allowed to return to room temperature before laminating the positive electrode to the electrolyte at room temperature. This enables to prevent the formation of wrinkles on the collector of the positive electrode.

9 Claims, 1 Drawing Sheet

PROCESS FOR ASSEMBLING LPB BATTERIES

BACKGROUND OF THE INVENTION a) Field of the Invention

The present invention concerns a process for assembling LPB batteries. More particularly, the invention relates to the lamination of an electrolyte to a positive electrode under conditions enabling an excellent adhesion and preventing the formation of wrinkles at the outlet of the laminating device.

b) Description of Prior Art

The lithium/polymer electrolyte batteries (hereinafter designated LPB) are manufactured by superposing three main types of films: a film of a positive electrode containing an electrochemically active material, for example vanadium oxide, a film of an electrolyte consisting of a polymer and a lithium salt, and a film of metallic lithium. Each of these films is between 15 and 50 μm thick, for a total thickness of the elementary film of battery of 100 to 150 μm. About thirty meters of this elementary film, 15 cm wide, are typically required to give a battery of 100 Wh.

One of the main procedures for manufacturing LPB batteries consists in separately preparing the positive electrode and the electrolyte by solvent coating or by melt extrusion. The positive electrode is thereafter laminated to the electrolyte, then the lithium negative electrode is applied on the second face of the electrolyte. The positive electrode is coated on a metallic foil (for example aluminum) or on a metallized plastic film which serves as current collector, and which is left in the battery after lamination. The electrolyte is coated on a plastic substrate (for example a film of polypropylene), which is eliminated after lamination to the positive electrode and before applying the lithium electrode.

If the lamination is carried out directly with the laminating rolls kept at room temperature, the adhesion between the electrolyte and the positive electrode is not very good and the electrochemical impedance of the interface is high. If the laminating rolls are heated and the temperature of the electrolyte gets higher than its softening temperature (60°–80° C.) during lamination, the adhesion and the electrochemical interface become excellent, but wrinkles are often formed at the outlet of the laminating rolls, when the films return to room temperature, because of the differences in thermal expansion and elongation between the electrolyte and the substrate of the electrolyte and of the electrode. These wrinkles may cause short-circuits in the final battery, and reduce its energy density.

SUMMARY OF INVENTION

In order to overcome these disadvantages, we have developed a process for assembling an LPB battery made of a film of positive electrode containing an electrochemically active material, a film of an electrolyte made of a polymer and a lithium salt, and a film of a negative electrode consisting of lithium, in which the positive electrode and the electrolyte are separately prepared, the positive electrode is thereafter laminated to one face of the electrolyte, and the negative electrode is applied on the other face of the electrolyte. The process is characterized in that previously to laminating the positive electrode to the electrolyte, the electrolyte is heated at a temperature higher than its softening temperature or the melting point of its crystallites, and the electrolyte is thereafter brought to room temperature before laminating the positive electrode to the electrolyte at room temperature.

The invention results from the observation that electrolytes become soft, amorphous and sticky when they are heated at a temperature higher than their softening temperature or the melting temperature of their crystallites (which may occur between 50° and 100° C., more commonly around 60° to 80° C.) and they preserve these superior qualities of adhesion for some time after having been brought back to room temperature. The invention therefore consists in heating the electrolyte a few moments before lamination, bringing it back to room temperature and laminating it to the positive electrode at room temperature. The result is a combination of an excellent adhesion and the absence of wrinkles after lamination.

The application of this principle to the lamination of a positive electrode to an electrolyte just coming out of the drying tunnel after coating presents the additional interest of eliminating the need for a protection film on the electrolyte, the peeling of which constitutes a slow and costly step in the subsequent industrial manufacturing process.

The families of polymers preferably used in electrolyte films are described in Armand U.S. Pat. No. 4,303,748 as well as more in detail in U.S. Pat. Nos. 4,578,326 and 4,357,401 and Canadian Patent No. 1,269,702. They consist for example of amorphous copolymers and terpolymers which are cross-linkable or non cross-linkable. The latter are not actually commercially available, and are synthesized with coordination catalysts of the type described in Vandenberg U.S. Pat. No. 3,205,183 (September 1965).

With respect to the salts of lithium, they are preferably selected from the families of salts which can be used in the LPB electrolytes described in Armand U.S. Pat. No. 4,303,748 as well as the more complex salts based on lithium trifluorosulphonimide (TFSI) or lithium bis halogenoacyl or sulphonylimines (TFSM), which are cross-linkable or non cross-linkable, and are described in U.S. Pat. Nos. 4,505,997 and 4,818,694 and PCT W092/02966 of Jul. 25, 1991.

Many types of heating devices may be used to bring the electrolyte to a temperature higher than its softening temperature or the melting point of crystallites: infra-red lamps, hot air or gas blowers, heating rollers, etc. The drying tunnel of the electrolyte solvent coater is a particularly interesting possibility.

The softening temperature or melting point of the crystallites obviously depend on the nature of the polymer and of the lithium salt used in the electrolyte and vary from 50° to 120° C. for the combinations of electrolytes described above. Temperatures of 60° to 80° C. are typical with the amorphous copolymers and plasticizing salts.

The period during which the electrolyte remains soft, amorphous and sticky after having been heated above its softening temperature (crystalline melting), depends also on the nature of the electrolyte, and may vary from a few minutes for the more crystalline combinations to a few hours for the more amorphous. Such a delay leaves in most cases a sufficient time margin to achieve the lamination according to the invention.

BRIEF DESCRIPTION OF DRAWINGS

The invention is illustrated by the annexed drawings given by way of illustration but without limitation, in which.

DESCRIPTION OF PREFERRED EMBODIMENTS

Figure 1:
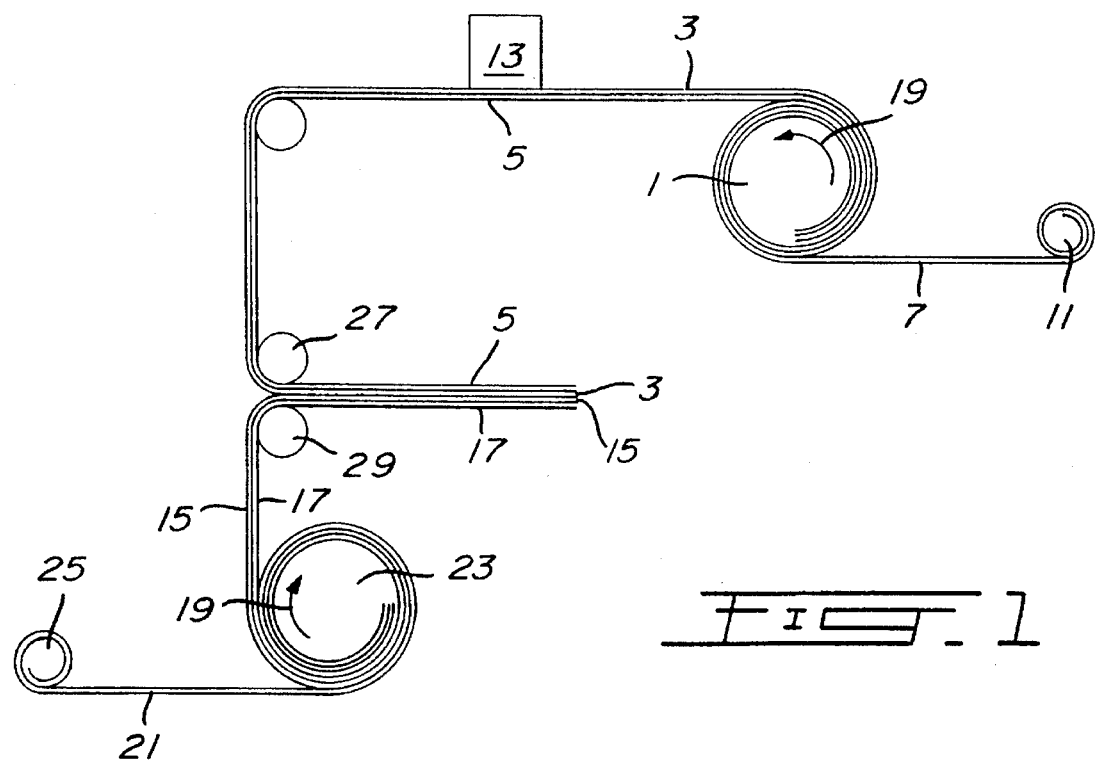
FIG. 1 is a schematic illustration of a process for assembling batteries according to the invention.
Figure 2:
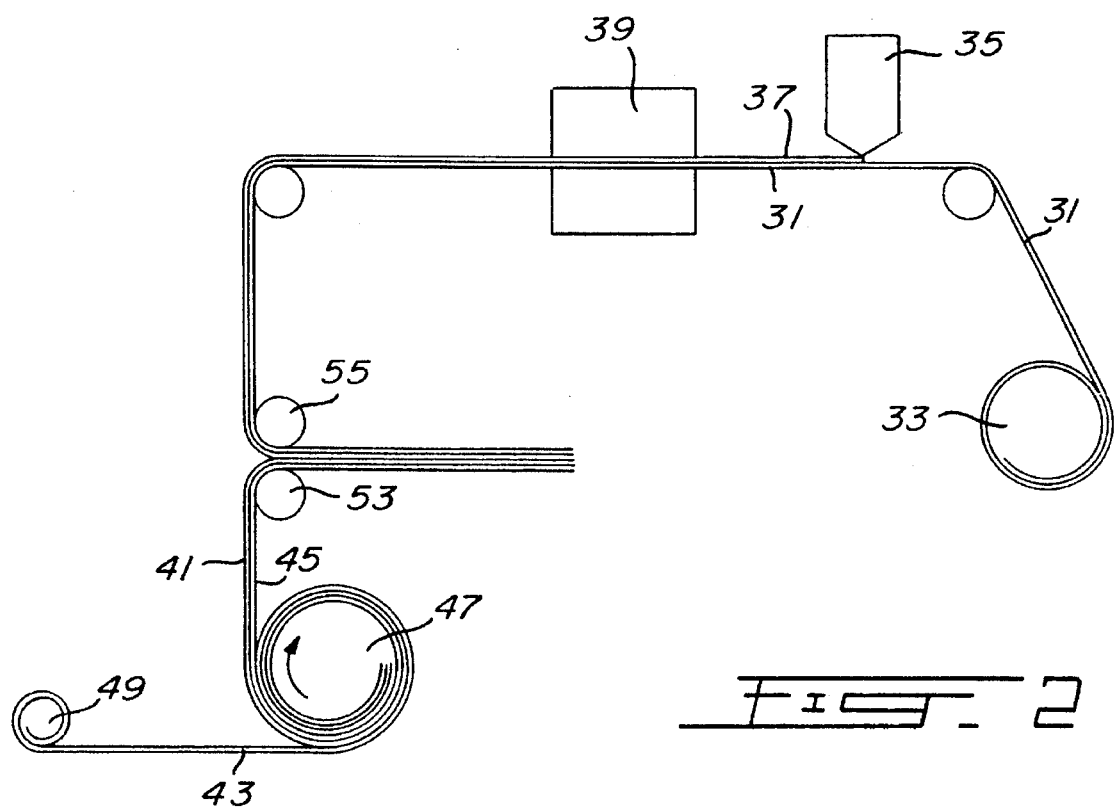
FIG. 2 is another schematic illustration of a modification of the process for assembling batteries according to the invention.

Two examples of battery assembling which can be used to achieve the invention are indicated in FIGS. 1 and 2.

In FIG. 1, there is a roll 1 of electrolyte film 3 previously prepared, including its own polypropylene substrate 5 and its polyethylene protection film 7. Roll 1 is unwound in the direction of rotation indicated by arrow 19 and the protection film is peeled and thereafter wound over roller 11. The film of electrolyte 3 is heated by means of a hot air gun 13 or by any other method. Meanwhile, a film of positive electrode 15, separately prepared on its aluminum collector 17 with a protection film 21, is unwound, from roll 23 in the direction of arrow 19. The protection film is first peeled, and rewound on roller 25. The film of electrolyte 3 is laminated on the positive electrode 15 by passing both between rollers 27 and 29, thereby giving an assembly ready to be laminated with a negative electrode, after having peeled the polypropylene substrates.

On FIG. 2, there is an electrolyte substrate 31, made of polypropylene, wound on roller 33. The substrate 1 is unwound and passed under the coating head 35, which applies a film of electrolyte solution 37 on the substrate. The electrolyte film 37 and its substrate 31 run through a drying tunnel 39 which is heated to between 60° and 90° C., and where the solvents are evaporated. The electrolyte exits the tunnel in an amorphous and sticky state and is thereafter cooled before lamination with the film of positive electrode 41. The latter is wound with its protection film 43 and its aluminum collector 45 on roller 47. The protection film is peeled and wound on roller 49. Lamination is carried out between the two laminating rolls 53 and 55.

The invention is also illustrated by the examples which follow given without limitation.

EXAMPLE 1

A solution of positive LPB electrode material, containing 2.3 Kg of copolymer, 0.5 Kg of lithium salt TFSI, 5.3 Kg of vanadium oxide and of carbon black, in 17 L of acetonitrile and 5 L of toluene, is coated on an aluminum foil 25μ thick and 15 cm wide, with a coating head of the "doctor blade" type. The solvent is evaporated in a drying tunnel 15 meters long, at 70° C., leaving on the aluminum foil a dry film of positive electrode about 40μ thick. The aluminum-positive electrode combination is wound on a 15 cm-in-diameter core, with a protection film of polyethylene 20 cm wide and 100μ thick.

A solution of LPB electrolyte containing 3.7 Kg of copolymer and 0.8 Kg of TFSI salt, in 15 L of acetonitrile and 4.5 L of toluene is thereafter coated on a polypropylene film 25μ thick and 15 cm wide, and the solvents evaporated in the drying tunnel.

EXAMPLE 2

The electrolyte film of example 1 on its polypropylene substrate, is covered at the outlet of the drying tunnel with a protection film of polyethylene 20 cm wide and 100μ thick, and wound on a 15 cm-in-diameter. The roll of electrolyte film thus made, and the roller of positive electrode film prepared in example 1, are thereafter introduced between laminating rolls maintained at room temperature, after having peeled the protection film of polyethylene from the positive electrode, and the protection film of polyethylene or the polypropylene substrate of the electrolyte. In both cases, wetting of the positive electrode by the electrolyte is not good, indicating a poor adhesion at the interface.

EXAMPLE 3

The laminating rolls of example 2 are heated to a temperature of 60° C. Wetting and adhesion at the interface become very good, but wrinkles appear in the aluminum shortly after exiting from the laminating when the films are cooled.

EXAMPLE 4

The laminating rolls of example 2 are brought back to room temperature, hot air at 80° C. is directed towards the peeled surface of the electrolyte, about 1 meter before the inlet of the laminating rolls, by means of a hot air gun. Rapidly after having left the zone where it is exposed to hot air, and upon entering the laminating rolls, the electrolyte film has returned to room temperature, but it is still soft. Wetting and adhesion to the positive electrode are excellent and there are no wrinkles in the aluminum foil at the outlet of the lamination.

EXAMPLE 5

Example 1 is repeated but the roll of polyethylene protection film for the electrolyte is replaced by the roll of positive electrode film, and the laminating rolls, operated at room temperature, are placed at the outlet of the drying tunnel. After having peeled its polyethylene protection film, the positive electrode is laminated to the film of electrolyte which exits from the drying tunnel. The results are excellent, as in example 4.

A sample of the electrode/electrolyte combination thus laminated is covered with a film of lithium 20μ thick, after having peeled the polypropylene substrate of the electrolyte, so as to produce an LPB battery displaying excellent electrochemical properties, in all respects comparable to those obtained in the laboratory under standard conditions.

We claim:

1. A process for making an electrode/electrolyte laminate for use in an LPB battery said laminate comprising a positive electrode film containing an electrochemically active material, an electrolyte film made of polymer and lithium salt, and a film of negative electrode made of lithium, said process comprising:

separately preparing (1) a positive electrode, and (2) an electrolyte, laminating the positive electrode to one face of the electrolyte, applying the negative electrode to the other face of the electrolyte, said process being characterized by:

heating the electrolyte before laminating the positive electrode and the electrolyte, to a temperature higher than its softening temperature or the melting temperature of its crystallites, and thereafter, bringing the heated electrolyte back to room temperature before laminating the positive electrode to the electrolyte at room temperature, whereby said lamination is carried out during the soft, amorphous and sticky state of the polymer, prior to crystallization of said polymer.

2. Process according to claim 1, wherein the electrolyte is heated to a temperature between about 50° and 120° C.

3. Process according to claim 1, wherein said temperature is between about 60° and 80° C.

4. Process according to claim 1, wherein the electrolyte consists of amorphous copolymers or terpolymers, which are cross-linkable or non cross-linkable and contain a lithium salt.

5. Process according to claim 4, wherein the lithium salt is selected from lithium trifluorosulfonimide, lithium bis halogenoacyl and lithium sulfonylimides.

6. Process according to claim 1, wherein the electrolyte is heated by means of infra-red lamps, hot air or gas blowers or heating rollers.

7. Process according to claim 1, in which the electrolyte is prepared by solvent coating, wherein the electrolyte is heated during its passage in the drying tunnel.

8. Process according to claim 1, which comprises unwinding a roll of electrolyte film covered on one side with a protection film and with a substrate on the other side, peeling the protection film and winding it separately on a roller, subjecting the electrolyte film without its protection film to heating at said temperature higher than its softening temperature or melting temperature of its crystallites, and allowing it to run a distance long enough to return to room temperature, before laminating same at room temperature to a film of positive electrode, prepared on a metallic collector and from which the own protection film has been peeled off.

9. Process according to claim 1, which comprises continuously unwinding a plastic film substrate, coating an electrolyte film on said substrate, passing the electrolyte film on its substrate in a drying tunnel where said electrolyte is heated at said temperature higher than its softening temperature or the melting temperature of its crystallites, separately unwinding a film of positive electrode prepared on a metallic collector and covered with a protection film, peeling the latter, and allowing the electrolyte to run a distance long enough to return to room temperature, before laminating it at room temperature to the film of positive electrode, from which the own protection film has been peeled off.

* * * * *